July 30, 1957
J. F. CALVERT ET AL
2,801,351
METHOD AND APPARATUS FOR CONTROL OF SYSTEM
OUTPUT IN RESPONSE TO SYSTEM INPUT
Filed Oct. 27, 1952
3 Sheets-Sheet 1
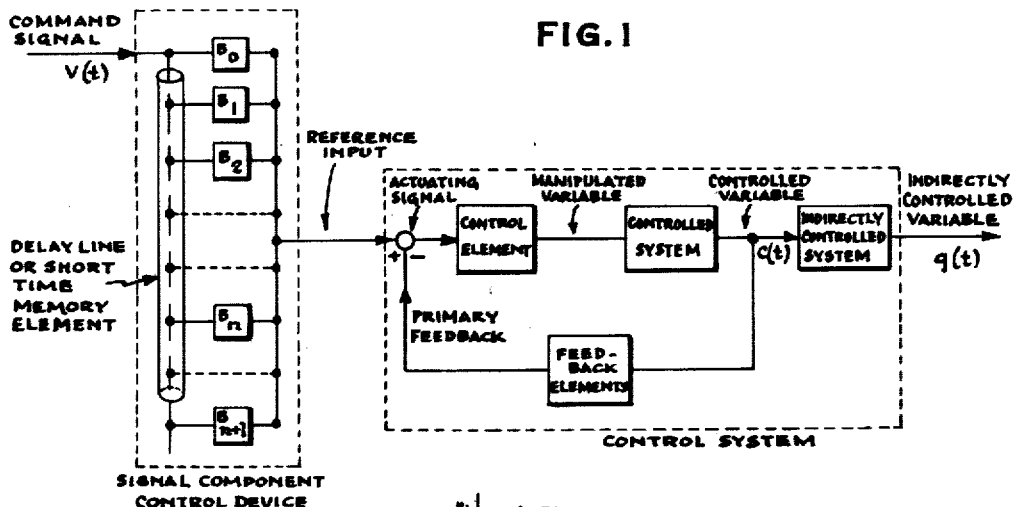
FIG. 1
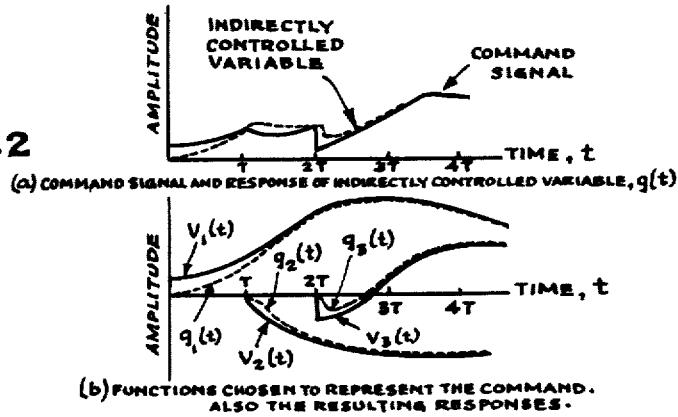
FIG. 2
(a) COMMAND SIGNAL AND RESPONSE OF INDIRECTLY CONTROLLED VARIABLE, $q(t)$
(b) FUNCTIONS CHOSEN TO REPRESENT THE COMMAND. ALSO THE RESULTING RESPONSES.
FIG. 3
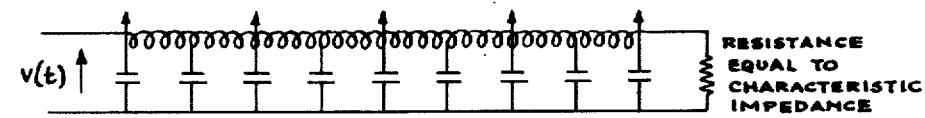
FIG. 4
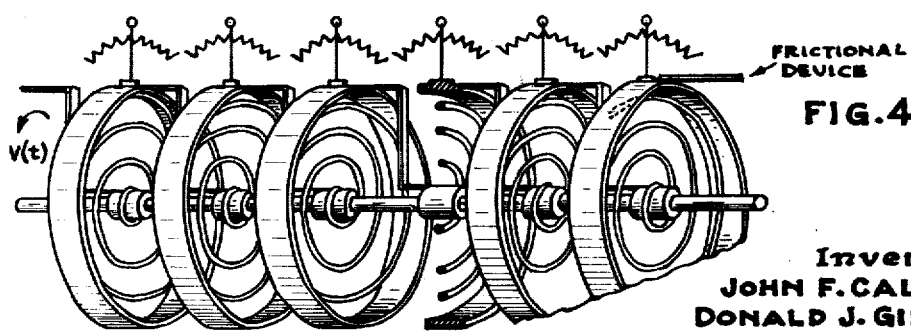
Inventors
JOHN F. CALVERT
DONALD J. GIMPEL
By Mann, Brown & McWilliams
Attorneys

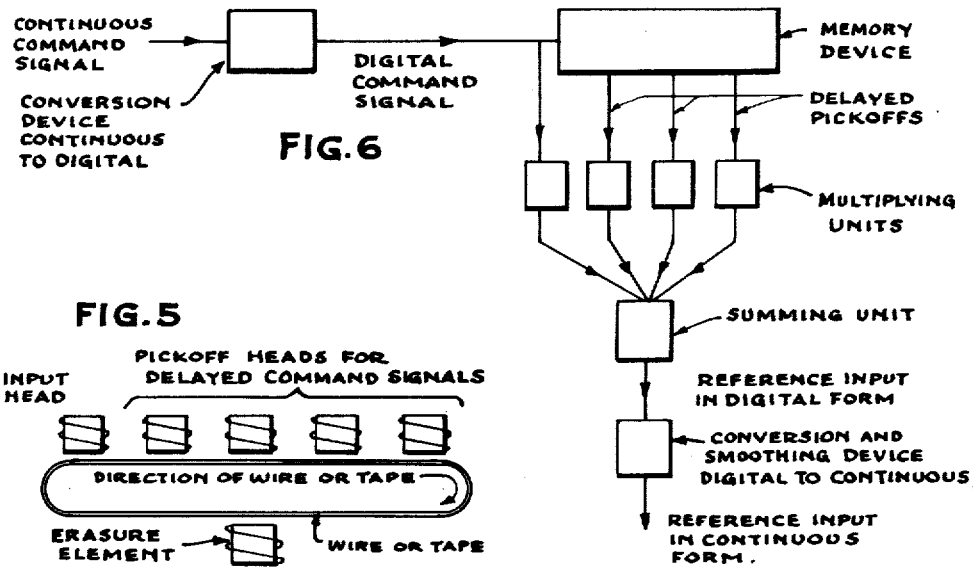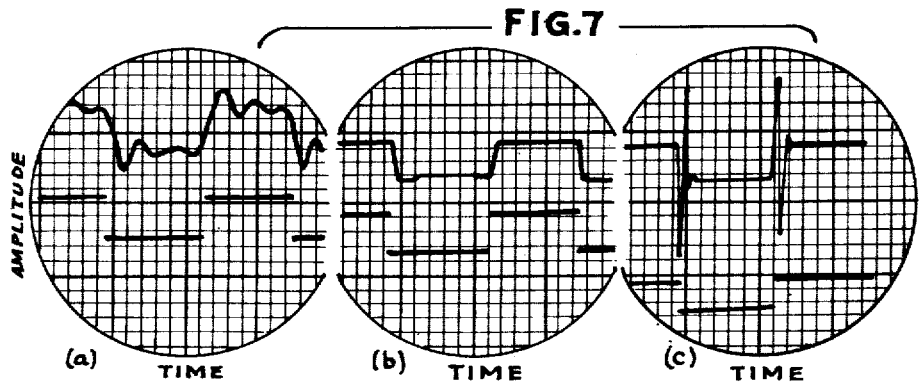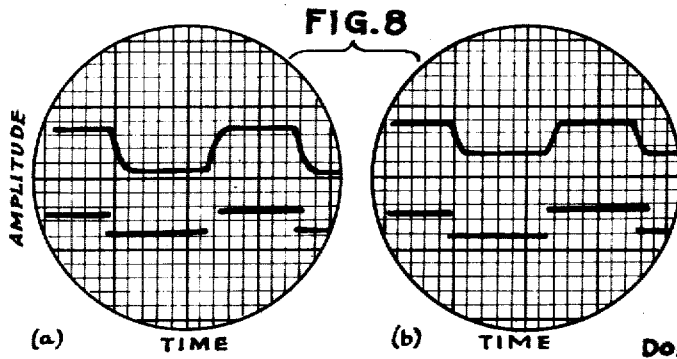

United States Patent Office 2,801,351
Patented July 30, 1957

2,801,351

METHOD AND APPARATUS FOR CONTROL OF SYSTEM OUTPUT IN RESPONSE TO SYSTEM INPUT

John F. Calvert, Wilmette, and Donald J. Gimpel, Chicago, Ill.; said Gimpel assignor to said Calvert Application October 27, 1952, Serial No. 317,118

8 Claims. (Cl. 307—149)

This invention relates to a method and apparatus for controlling the output of a system, whether mechanical, hydraulic, electrical, or the like, or combination of such systems, in response to the system input, which normally is in the form of a variable function of time. The invention has broad application, as will hereinafter become apparent. More specifically, the invention relates to a method and apparatus for taking a given input signal or force, delaying the signal or force discrete intervals of time to thereby produce a plurality of component signals or forces, each of which is then amplified or attenuated, with or without, change of sign or direction, and then adding such resulting components to produce a signal or force which acts as a control signal or force applied to the system being controlled.

By properly controlling the time delays and amplifications or attenuations of the discrete components of the command signal, the output of the control system can be made to closely match a predetermined function of the command signal or force.

The AIEE symbols and definitions for feedback control systems proposed in the AIEE Committee Report, entitled "Proposed symbols and terms for feedback control system," and published in Electrical Engineering, vol. 70, October 1951, pp. 905–909, will be employed throughout this disclosure, except as hereinafter indicated.

It will be assumed that the command signal is received with suitable amplification and in appropriate electrical, mechanical, or other physical form so that the "reference input elements" will be omitted although the term "reference input" will be retained to signify the input signal to the control system. The term "signal component control" (abbreviated at times by scc.) will be introduced to designate a new control method, and the term "signal component control device" will be employed to specify the major arrangement of associated equipment.

Signal component control is a method in much the same sense as is negative feedback control, but it is a different method. Since scc. is a method, it becomes immaterial whether or not the elements employed at any location, either in the scc. device itself or in the control system, are of electrical, mechanical, hydraulic or other physical form provided the same basic method of control applies. Specific examples will be presented later to illustrate elements of different physical forms which will perform in analogous fashions to fulfill the requirements of the method.

The objects of the invention may best be understood by reference to Figure 1 of the drawings. It is intended that the scc. device shall so shape the reference input in terms of the command signal and the characteristics of the control systems that either the directly or indirectly controlled variable (as may be desired) will be compelled to respond as detailed by one of the following objectives:

1. The first or primary object is to compel the controlled variable to very nearly match the command signal at every instant of time. (The controlled variable as used here and in later parts of this disclosure may be taken to mean either the directly or the indirectly controlled variable.)

2. Another objective can be to make the controlled variable match a specified linear combination of the derivatives of the command signal or a specified linear function of the derivatives of the command signal.

3. Another objective can be to compel the controlled variable to oscillate at any one or a combination of the natural frequencies of the control system itself regardless of the shape of the command signal.

4. Another objective can be to compel the controlled variable to contain components each of which performs individually in accord with some combination of the preceding objectives.

Consider the first or primary objective. This may be stated, as follows, in terms of three sub-goals:

1. The controlled variable will, at all times, contain a component which exactly matches (i. e. is identically equal to) the command signal.

2. In a very short time (usually this will be made less than one-half the longest natural period of oscillation of the control system) all aperiodic deviations of the controlled variable from the command signal will be reduced to zero (and remain zero thereafter).

3. In the same short time each natural mode of the control system will be reduced to zero.

At least in theory, the foregoing sub-goals may be achieved exactly for linear control systems when the command signal can be expressed as a polynomial function of time. Under these circumstances, the objective will be achieved regardless of the magnitude of the coefficients in the polynomial. In practice, it is found that if the command signal can be approximated in the first short period of time mentioned above by such a polynomial, and then in the second such short period by two such polynomials, etc.; then the primary objective may be substantially achieved. Consideration of the experimental data will bear this out.

It will be found that the components in the controlled variable might be defined and then assigned values to meet the various objectives which have been listed above. This is shown in Table 1, shown below.

TABLE 1
COMPONENT IN THE CONTROLLED VARIABLE

| (A) A component which may be made equal to the command signal | (B) One or more components which produce aperiodic deviation from the desired value under objective (1A) | (C) One component for each natural mode in the control system, each of which also produces deviations from the objective under (1A) |
| --- | --- | --- |
| | Values it is Desired to have Components Approach After a a Very Short Period Time | |
| *Objective 1* | *Objective 1* | *Objective 1* |
| This component to be made equal to the command signal (1A). | Each of these components to be made equal to zero. | Each of these components to be made equal to zero. |
| *Objective 2* | *Objective 2* | *Objective 2* |
| This component to be made equal to zero. | One or more of these components to be made equal, correspondingly, to one or more derivatives of the command signal. The remaining of these components to be made equal to zero (1B). | Each of these components to be made equal to zero. |
| *Objective 3* | *Objective 3* | *Objective 3* |
| This component to be made equal to zero. | Each of these components to be made equal to zero. | One or more of these components to be made to appear and the remainder to be made equal to zero (1C). |
| *Example of Objective 4* | *Example of Objective 4* | *Example of Objective 4* |
| Same as for (1A). | Same as for (1B). | Same as for (1C). |

Further and other objects and advantages will become apparent as the disclosure proceeds and the description is read in conjunction with the accompanying drawings, in which Figure 1 shows an example of a signal component control device employed to force a controlled variable $q(t)$ to closely match command signal $v(t)$;

Figure 2 illustrates the superposition of command functions and of the responses for the representation of the total command signal and the total controlled variable, respectively, the figure comprising sub-figures $a$ and $b$;

Figure 3 shows an electrical delay line which may be used to delay the command signal and provide the desired delayed components;

Figure 4 shows a mechanical equivalent of the electrical delay line using rotating masses and coil springs with the displacement of the masses being recorded on potentiometers;

Figure 5 shows a wire or tape recorder which may be used for the same purpose;

Figure 6 is a block diagram illustrating how the same purpose may be achieved by converting a continuous input signal to digital quantities, carrying out the necessary delaying, amplifying and/or attenuating, summing the components in digital form, and then converting the sum to an effective continuous function of time which is the desired reference input signal;

Figure 9:
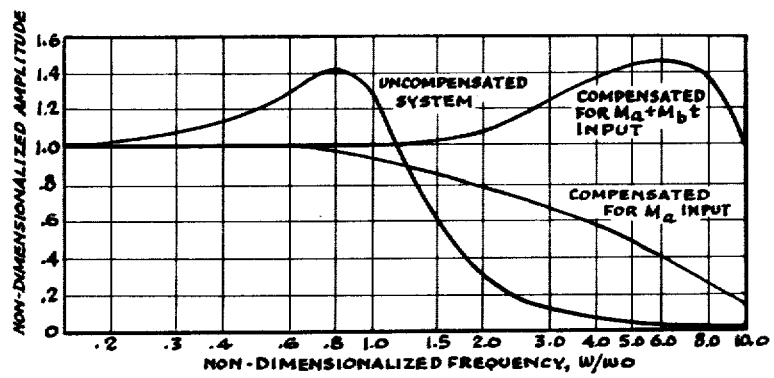
Figure 10:
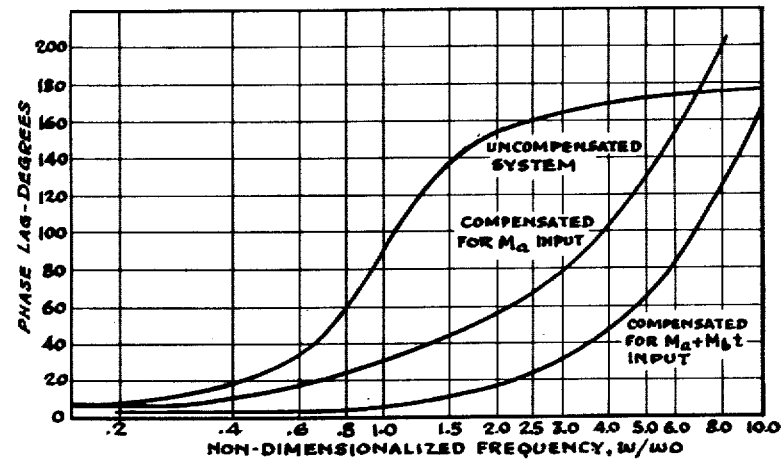
Figure 11:
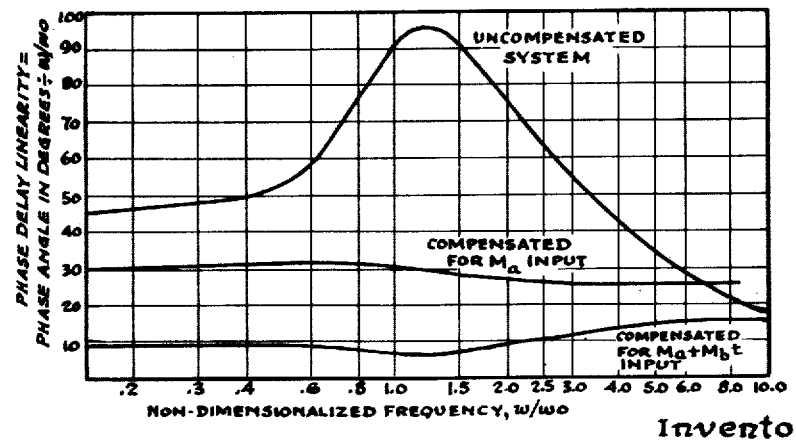

Figure 7, composed of sub-figures $a$, $b$ and $c$, shows the response of a two-mode oscillatory control system to a step command signal. In all of the figures the step input signal is shown at the bottom. In sub-figure $a$, the upper curve shows the controlled variable $q$ when the signal component control of this invention is not used. The upper curve in sub-figure $b$ shows the controlled variable when the signal component control of this invention is used. In sub-figure $c$, the upper curve illustrates the reference input to the control system for the particular conditions shown in sub-figure $b$;

Figure 8 is composed of sub-figures $a$ and $b$ and shows the response of a single mode control system to a step command signal, with sub-figure $a$ illustrating the nature of the controlled variable when signal component control is not used, and sub-figure $b$ showing what occurs when the signal component control is used;

Figure 9 shows the amplitude response corresponding substantially to the control system of Figure 7;

Figure 10 shows the phase lag response corresponding substantially to the control system of Figure 7; and Figure 11 shows the phase delay linearity corresponding substantially to the control system of Figure 7.

General remarks on the SCC. method

Certain general statements will be made concerning the signal component control method which will apply regardless of which of the foregoing objectives it is desired to achieve. In its simplest form the method involves an scc. device driving an open loop control system. However, it is usually desirable to incorporate feedback within the control system itself, as is indicated in Figure 1. This feedback serves to decrease the longest natural period of oscillation of the control system. Another type of feedback, not shown in Figure 1, may be employed if the control system is non-linear. This type of feedback would cause a change in a parameter in the control system to make appropriate changes in the parameters of the scc. device such that the latter parameters would be continually adjusted to meet the requirements which a given objective places on the former parameter.

Theory

The theory of the signal component control method will be developed initially for a linear control system in terms of the first objective stated above. Then the theory will be extended in terms of the other objectives.

Various mathematical functions might be employed to describe the command signal. Polynomial representations will be employed in this discussion. Figure 2 ($a$) shows the command signal $v(t)$ which, as indicated in Figure 2 ($b$), will be defined as shown in Equations 1.

In the time interval, $v(t)$ will be characterized by:

$$\left.\begin{aligned} t<0 & \quad v(t)=0 \\ 0<t<T & \quad v(t)=v_1(t) \\ T<t<2T & \quad v(t)=[v_1(t)+v_2(t)] \\ T<t<3T & \quad v(t)=[v_1(t)+v_2(t)+v_3(t)] \text{ etc.} \end{aligned}\right\} (1)$$

In general, the period of time, T, will be chosen less, and sometimes appreciably less, than one-half the period of the longest natural oscillation of the control system. Let it be expected that the indirectly controlled variable is to match the command signal near the ends of these time periods and that it is not to deviate greatly at any intermediate instant of time. The scc. device should produce a reference input such that after time T, 2T, 3T etc. the controlled variable will match each of the respective individual functions $[v_1(t)]$, $[v_1(t)+v_2(t)]$, $[v_1(t)+v_2(t)+v_3(t)]$, etc. Suppose that at $t=0$, $v_1(t)$ were applied and the controlled variable matched $v_1(t)$ for $t>T_{n+1}$. Assume for the moment that this were true regardless of whether the command signal were $v_1(t)$ or $v_2(t)$, or $v_3(t)$, etc. Then since for a linear control system superposition principles are applicable, reference to Figure 2 shows that the desired results may be obtained when these individual signals are applied one after another and then sustained for an indefinite period of time as indicated above by Equations 1. Now let any one of these individual command functions be called $v(t)$, and assume that they can be described with satisfactory reliability by a polynomial such as, $$v(t) = M_a + M_b t + M_c t^2 + M_d t^3 \quad 2\ (a)$$

or perhaps with less accuracy by $$v(t) = M_a + M_b t \quad 2\ (b)$$

Although it is not essential to the theory, two simplifying steps will be taken for illustrative purposes. First, Equation 2 (b) will be employed and, second the control system will be considered to be linear and to have no multiple roots in its associated characteristic equation. Hence, if the reference input applied to the control system itself were a step (or Heaviside unit function) the indirectly controlled variable would be, $$q(t) = A_0 + \sum_1^n A_k \epsilon^{\xi_k t} \qquad (3)$$

Then, if the reference input were of the form shown by Equation 2 (b), the superposition theorem may be employed in establishing the response, $$q(t) = M_a \left[ A_0 + \sum_1^n A_k \epsilon^{\xi_k t} \right] + \int_0^t M_b \left[ A_0 + \sum_1^n A_k \epsilon^{\xi_k t} \epsilon^{-\xi_k \lambda} \right] d\lambda \qquad (4)$$

where $\lambda$ is a dummy variable of integration $$q(t) = A_0[M_a + M_b t] - M_b \sum_1^n \frac{A_k}{\xi_k} + \sum_1^n A_k \left[ M_a + \frac{M_b}{\xi_k} \right] \epsilon^{\xi_k t} \qquad (5)$$

Assume now, that the following may be achieved with the scc. device:

(1) The command signal, $v(t)$, may be delayed the discrete amounts of time, $t=0, T_1, T_2 \ldots T_n \ldots T_{n+l}$, where, $0 < T_1 < T_2 < T_3 < \ldots T_n < \ldots < T_{n+1}$.

(2) At the corresponding instants of time, the command function $v(t)$ may be amplified or attenuated with or without change of sign. That is $v(t)$ and the delayed forms may be changed in value by multiplying by the constant positive or negative real numbers, $B_0, B_1, B_2 \ldots B_{n+l}$, respectively.

(3) The results of the above two operations are summed to yield the output of the scc. device, which is the reference input applied to the control system.

Under these new conditions the response of the control system becomes, for $t > T_{n+l}$ $$q = B_0 A_0[M_a + M_b t] - B_0 M_b \sum_1^n \frac{A_k}{\xi_k} + B_0 \sum_1^n A_k \left( M_a + \frac{M_b}{\xi_k} \right) \epsilon^{\xi_k t}$$

$$+ B_1 A_0[M_a + M_b t] - B_1 M_b \sum_1^n \frac{A_k}{\xi_k} + B_1 \sum_1^n A_k \left( M_a + \frac{M_b}{\xi_k} \right) \epsilon^{\xi_k (t - T_1)} - B_1 M_b A_0 T_1$$

$$\vdots$$

$$+ B_{n+l} A_0[M_a + M_b t] - B_{n+l} M_b \sum_1^n \frac{A_k}{\xi_k} + B_{n+l} \sum_1^n A_k \left( M_a + \frac{M_b}{\xi_k} \right) \epsilon^{\xi(t - T_{n+l})} - B_{n+l} M_b A_0 T_{n+l} \qquad (6)$$

Any of the B and the T values may be varied within broad limits. Hence, it may be elected to place restrictions on Equation 6 in order to achieve certain desired results. Such a set of Equations 7, where it assumed that $A_0 \neq 0$, establishes such a set of restrictions.

$$A_0[M_a + M_b t][B_0 + B_1 + \ldots + B_{n+l}] = M_a + M_b t \quad 7 \text{ (a)}$$

$$-M_b \left[ \left( \sum_1^n \frac{A_k}{\xi_k} \right) B_0 + \left( A_0 T_1 + \sum_1^n \frac{A_k}{\xi_k} \right) B_1 + \ldots + \left( A_0 T_{n+l} + \sum_1^n \frac{A_k}{\xi_k} \right) B_{n+l} \right] = 0 \quad 7 \text{ (b)}$$

$$\left. \begin{array}{l} A_1 \left( M_a + \dfrac{M_b}{\xi_1} \right) \epsilon^{\xi_1 t} [B_0 + \epsilon^{-\xi_1 T_1} B_1 + \ldots + \epsilon^{-\xi_1 T_{n+l}} B_{n+l}] = 0 \\[6pt] A_n \left( M_a + \dfrac{M_b}{\xi_n} \right) \epsilon^{\xi_n t} [B_0 + \epsilon^{-\xi_n T_1} B_1 + \ldots + \epsilon^{-\xi_n T_{n+l}} B_{n+l}] = 0 \end{array} \right\} 7 \text{ (c)}$$

From Equations 7, $$B_0 + B_1 + B_2 + \ldots + B_{n+l} = \frac{1}{A_0} \qquad 8 \text{ (a)}$$

$$T_1 B_1 + T_2 B_2 + \ldots + T_{n+l} B_{n+l} = \frac{-\sum_1^n \frac{A_k}{\xi_k}}{A_0^2} \qquad 8 \text{ (b)}$$

$$\left. \begin{array}{l} B_0 + \epsilon^{-\xi_1 T_1} B_1 + \epsilon^{-\xi_1 T_2} B_2 + \ldots \epsilon^{-\xi_1 T_{n+l}} B_{n+l} = 0 \\ B_0 + \epsilon^{-\xi_2 T_1} B_1 + \epsilon^{-\xi_2 T_2} B_2 + \ldots \epsilon^{-\xi_2 T_{n+l}} B_{n+l} = 0 \\ \vdots \\ B_0 + \epsilon^{-\xi_n T_1} B_1 + \epsilon^{-\xi_n T_2} B_2 + \ldots \epsilon^{-\xi_n T_{n+l}} B_{n+l} = 0 \end{array} \right\} 8 \text{ (c)}$$

The B and T values, as determined from Equations 8 (a) through 8 (c), define a set of signal components which, when employed in the design of the scc. device, permit the first or primary objective to be achieved. It will be noted that while Equations 8 (a) through 8 (c) are influenced by the form chosen for $v(t)$, the magnitudes of the coefficients in $v(t)$ and the independent variable $t$ no longer appear. This becomes of great value in the signal component control method. It will be elected to make $l=1$ because in (8) this will yield $(n+2)$ of the B terms and $(n+1)$ of the T terms. Equations 8 are linear with respect to the former and nonlinear with respect to the latter terms. In consequence, if $(n+l+1)$ is large, it is far easier to choose values for the T terms and then compute the B values than it is to carry out the reverse of this process. The T values, of course, are positive real numbers. It may be noted that the terms and the A terms appear either as real numbers or else in complex conjugate pairs. In every instance the B terms will be either positive or negative real numbers.

If the general performance of the control system can be described by the differential equation, $$a_n \frac{d^n q(t)}{dt^n} + a_{n-1} \frac{d^{n-1} q(t)}{dt} + \cdots + a_1 \frac{dq(t)}{dt} + a_0 q(t) = f[v(t)] \qquad (9)$$

it may be of interest to note that the following realtions hold $$\left. \begin{array}{l} \dfrac{1}{A_0} = a_0 \\[8pt] \dfrac{\sum_1^n \dfrac{A_k}{\xi_k}}{A_0^2} = A_1 \end{array} \right\} \qquad (10)$$

In the development of Equations (8), the general form of Equation 2(b) described both the initial command signal and the changes in the shape of the command signal across the succeeding time periods. If additional terms are employed in the polynomial, as shown for example, by Equation 2(a), then an equation similar to (6) is obtained. Within this new equation the choice of the B and T values may be varied and, as before, restrictions may be established in order to achieve the first or primary objective of the scc. method. Thus, similar to Equations 8, the following will be established:
(a) There will be a single equation (as in 8(a)) which specifies that a component of the control variable at all times matches the command signal; (b) there will be, instead of the single Equation 8(b), a set of equations which require that all aperiodic output errors be eliminated in a short period of time $T_{n+l}$; and (c) there will be a set of equations which, like 8(c) require that the natural modes appearing in the controlled variable cease in the same short period of time. This period of time is usually chosen to be less than the longest natural period of oscillation for the control system. It will be found that the magnitude of the coefficients, $M_a$, $M_b$, $M_c$, $M_d$, etc. (see Equation 2(a)) do not appear anywhere in this system of equations (which are similar in requirements to those of Equations 8). Thus the scc. method remains independent of the coefficients of the polynomial representing the command signal. It is seen that the theoretical criteria for the design of the scc. device depends only on (1) the degree of the polynomial employed in the representation of the command signal, and (2) the actual parameters employed in the linear representation of the control system.

The foregoing relates to the first or primary objective of the scc. method, but much of this theory is applicable also to the other objectives. How the theoretical criteria may be altered for each objective will be illustrated next. References to Table 1 to and to Equations 7 are suggested at this point. To meet the second objective it is elected: (a) to make the left-hand side of Equation 7(a) equal to zero; (b) to make the left-hand side of Equation 7(b) equal to $(-K_M M_b)$ where $K_M$ is a constant real number; and (c) to make the left-hand side of each equation under 7(c) equal to zero. Then, in place of Equations 8 there results the following Equations 11, that is Equations 11(a) through 11(c), which give the theoretical criteria for evaluating the T and B values to satisfy the second objective, $$B_0 + B_1 + B_2 + \ldots + B_{n+l} = 0 \qquad 11(a)$$

$$T_1 B_1 + T_2 B_2 + \ldots + T_{n+l} B_{n+l} = \frac{K_M}{A_0} \qquad 11(b)$$

$$\left.\begin{array}{l} B_0 + \epsilon^{-\xi_1 T_1} B_1 + \epsilon^{-\xi_1 T_2} B_2 + \ldots + \epsilon^{-\xi_1 T_{n+l}} B_{n+l} = 0 \\ \vdots \\ B_0 + \epsilon^{-\xi_n T_1} B_1 + \epsilon^{-\xi_n T_2} B_2 + \ldots + \epsilon^{-\xi_n T_{n+l}} B_{n+l} = 0 \end{array}\right\} 11(c)$$

Again, if a higher degree polynomial had been chosen to represent a part of the command signal, then more equations would appear, but all in place of Equation 11(b), and greater latitude would be allowed. Other derivatives of the command signal might have been forced into the controlled variable. In general, the equations would be more complicated.

To establish the theoretical criteria needed to meet the third objective, it will be elected: to make the left sides of Equations 7(a) and 7(b) equal to zero; and to make for example, the $i^{th}$ equation under 7(c) equal to, $$\left[A_i\left(M_a + \frac{M_b}{\xi_i}\right)\epsilon^{\xi_i t} K_i\right]$$

where $K_i$ is a constant real number. When these steps are taken the following Equations 12 established the theoretical criteria for meeting the third objective:

$$B_0 + B_1 + B_2 + \ldots + B_{n+l} = 0 \qquad 12(a)$$

$$T_1 B_1 + T_2 B_2 + \ldots + T_{n+l} B_{n+l} = 0 \qquad 12(b)$$

$$\left.\begin{array}{l} B_0 + \epsilon^{-\xi_1 T_1} B_1 + \epsilon^{-\xi_1 T_2} B_2 + \ldots + \epsilon^{-\xi_1 T_{n+l}} B_{n+l} = 0 \\ \vdots \\ B_0 + \epsilon^{-\xi_{i-1} T_1} B_1 + \epsilon^{-\xi_{i-1} T_2} B_2 + \ldots + \epsilon^{-\xi_{i-1} T_{n+l}} B_{n+l} = 0 \\ B_0 + \epsilon^{-\xi_{i+1} T_1} B_1 + \epsilon^{-\xi_{i+1} T_2} B_2 + \ldots + \epsilon^{-\xi_{i+1} T_{n+l}} B_{n+l} = 0 \\ \vdots \\ B_0 + \epsilon^{-\xi_n T_1} B_1 + \epsilon^{-\xi_n T_2} B_2 + \ldots + \epsilon^{-\xi_n T_{n+l}} B_{n+l} = 0 \end{array}\right\} 12(c)$$

$$B_0 + \epsilon^{-\xi_i T_1} B_1 + \epsilon^{-\xi_i T_2} B_2 + \ldots + \epsilon^{-\xi_i T_{n+l}} B_{n+l} = K_i \qquad 12(d)$$

To establish a set of theoretical criteria to meet a possible fourth objective, which would be some combination of the first three, the specifications given in Table 1 will be employed. Referring again to Equation 7, it will be elected: (a) to make the left-hand side of Equation 7(a) equal to $[M_a + M_b t]$; (b) to make the left-hand side of Equation 7(b) equal to $[-K_M M_b]$; (c) to make the left-hand side of each equation under 7(c) except the one involving the $i^{th}$ mode equal to zero; and (d) to make the left-hand side of that equation under 7(c) which contains the $i^{th}$ mode equal to $$\left[A_i\left(M_a + \frac{M_b}{\xi_i}\right)E^{-\xi_i t} K_i\right]$$

When these steps have been taken Equations 13 are obtained, which establish the theoretical criteria for the particular fourth objective stated earlier: (Note if $\xi_i$ and $\xi_{i+1}$ are conjugate complex make the $i^{th}$ mode as above and the $(i+1)^{th}$ mode equal to $$\left[A_{i+1}\left(M_a + \frac{M_b}{\xi_{i+1}}\right)E^{-\xi_{i+1} t} K_i\right])$$

$$B_0 + B_1 + B_2 + \ldots + B_{n+l} = \frac{1}{A_0} \qquad 13(a)$$

$$T_1 B_1 + T_2 B_2 + \ldots + T_{n+l} B_{n+l} = \frac{K_M}{A_0} + \frac{\sum_{1}^{n} \frac{A_k}{\xi_k}}{A_0^2} \qquad 13(b)$$

$$\left.\begin{array}{l} B_0 + \epsilon^{-\xi_1 T_1} B_1 + \epsilon^{-\xi_1 T_2} B_2 + \ldots + \epsilon^{-\xi_1 T_{n+l}} B_{n+l} = 0 \\ \vdots \\ B_0 + \epsilon^{-\xi_{i-1} T_1} B_1 + \epsilon^{-\xi_{i-1} T_2} B_2 + \ldots + \epsilon^{-\xi_{i-1} T_{n+l}} B_{n+l} = 0 \\ B_0 + \epsilon^{-\xi_{i+1} T_1} B_1 + \epsilon^{-\xi_{i+1} T_2} B_2 + \ldots + \epsilon^{-\xi_{i+1} T_{n+l}} B_{n+l} = 0 \\ \vdots \\ B_0 + \epsilon^{-\xi_n T_1} B_1 + \epsilon^{-\xi_n T_2} B_2 + \ldots + \epsilon^{-\xi_n T_{n+l}} B_{n+l} = 0 \end{array}\right\} 13(c)$$

$$B_0 + \epsilon^{-\xi_i T_1} B_1 + \epsilon^{-\xi_i T_2} B_2 + \ldots + \epsilon^{-\xi_i T_{n+l}} B_{n+l} = K_i \qquad (13d)$$

It has been shown thus far in this section how appropriate combinations of time delays and of amplifications or attenuations could be calculated to meet any one of the objective when the control system was linear. The objectives and the appropriate equations employed to illustrate the relations to be satisfied are as follows:

For objective 1, Equations 8
For objective 2, Equations 11
For objective 3, Equations 12
For objective 4, Equations 13

Note when $\xi_i$ and $\xi_{i+1}$ are conjugate complex Equation 13 would be modified as indicated above by the parenthetical statement immediately preceding Equation 13.

In case the control system is in part non-linear, further steps are required. Suppose for instance the non-linearity were the load itself. If the system were electrical the load might be the energy input to a resistance and the controlled variable might be the voltage across this resistance. It should be possible, then, to choose some of the T and B values in the signal component control device and to compute the remaining correct T and B values for various values of the resistance in the load. Functions of the resistance could be determined which could be fed back to make the necessary changes in those remaining T and B values such that the signal component control device would be changing as was required to meet the changing requirements of the load resistance within the control system.

*Physical equipment*

The signal component control device in Figure 1 shows, in block diagram form, how the physical equipment may be arranged to satisfy the theortical criteria. Hence, when the appropriate physical values are used in accord with the criteria, the arrangement will cause any one of the objectives to be achieved. The signal component control device does the following:

1. It receives the command signal as shown in the upper left-hand corner of Figure 1 and delays it by specified amounts of time $T_1, T_2 \ldots T_{n+l}$. A delay line or other memory equipment may be employed for this purpose.

2. It amplifies or attenuates the command signal (see $B_0$ in Figure 1), does the same for each of the delayed signals and gives to each its appropriate positive or negative sign (see $B_1, B_2 \ldots B_{n+l}$ in Figure 1). The outputs from these units are the signal components.

3. It adds the signal components and applies the sum (which is the reference input) to the control system in order to force either the controlled variable or the indirectly controlled variable (as may be desired) to perform in accord with the initially specified objective.

Further details will be presented for the physical realization of the parts of the signal component control device shown in block diagram form on Figure 1.

Consider first the delay line or memory equipment. Figure 3 shows an electrical delay line. Figure 4 shows an approximate mechanical analogue of the electrical delay line. Figure 5 illustrates how a magnetic or tape recorder might be employed.

Next, consider the B terms. The design principles for electrical amplifiers and attenuators are well known and these might be employed in place of the $B_0, B_1 \ldots B_{n+1}$ blocks in the signal component control devices indicated in Figure 1.

It is possible to convert from continuous quantities, such as voltage or current, into digital quantities of an electrical or other form. These may be recorded in one of several types of memory devices. One such is a magnetic drum. The resulting sequences of numbers may each be multiplied by a fixed number, and the results added and subtracted as required, to give the reference input in the form of a sequence of digital values. This sequence may be converted to a smoothed continuous quantity which becomes the reference input. This last possibility is indicated in Figure 6. Any of the foregoing techniques and equipments may be employed in the signal component control device, or their analogues in other physical forms might be substituted.

Thus far in the disclosure it has been assumed that the signal component control device was situated between the location where the command signal was received and the location where the reference input was delivered to the control system. Where the control system was linear it can be seen from the theoretical work that this is not the only possibility. The same equations and hence the same theoretical criteria could have been developed if the command signal and the reference input had been identical provided the output of the control system had become the input to the scc. device. In this case where the scc. device came after the control system (instead of ahead of it) the output of the scc. device would be the controlled variable $q(t)$. Either way the value of $q(t)$ would have been the same. Also, if the control system were made up of cascaded unilateral sections, the scc. device could be placed at any intermediate position between the unilateral sections. Furthermore, a separate scc. device could be provided for each of the unilateral sections and then the scc. devices and sections cascaded in any order desired.

Also, it has been assumed in this disclosure that the control system was linear. Superposition methods were employed in the theoretical development. However, non-linearities in the control system will be considered, briefly. For example, suppose that the output was electrical and the load resistive, and that it is desired to have the voltage across the load follow the command signal. The resistance of the load may be considered as a varying parameter in the control system and the voltage across it as the controlled variable. If the load resistance changed what is now considered the control system would be changed. The B and T values could be computed for various load resistance values. It may be desirable to feedback a signal which is a function of the load resistance. However, this signal would not be combined directly with the reference input as would be done in conventional feedback. Instead, the feedback signal would be used to control B and/or T values in the scc. device itself in such a manner that an appropriate reference input was being formed continuously.

Experimental results

Experimental data will be presented to illustrate some of the results which may be expected from the use of the signal component control method. Two linear control systems are selected, one a first order and the other a second order system. The second order system had negative feedback included within it. Two forms of the scc. device were used. One is designed for only a step input $M_a$ and the other is designed for an input which includes a step plus a straight line term $[M_a+M_b t]$. All tests were carried out at audio frequencies and a special delay line was employed to obtain discrete time delays. The controlled and indirectly controlled variables are identical. Fig. 7 applies to a control system having two natural modes. The controlled variable follows the step signal when the scc. device is employed in much less than one-half the natural period of the control system. However, the output from the scc. device which is, in fact, the reference input to the control system, shows momentary overshoots that exceed the magnitude of the step type command function. See Figure 7(c). These overshoots can be greatly reduced at some sacrifice in the speed with which the controlled variable reaches the value desired. Figure 8 shows similar data for a control system having one natural mode. Figures 9, 10, and 11 show the influence of an scc. device on the amplitude, phase, and phase delay linearity responses for the two mode control system of Figure 7. As used in this disclosure, the term phase delay linearity means phase angle divided by the non-dimensionalized angular rate $\omega/\omega_0$ for an oscillatory system of two natural modes.

Summary

The signal component control method is one for compelling either the directly or indirectly controlled variable (as may be desired) to more closely follow the command signal or certain functions of the command signal and/or certain functions of the modes of the control system as defined earlier under the objectives. The control system and the scc. device may contain electrical, mechanical, or parts which are of other physical form provided their performance is analogous in the scc. method described. In its simplest form the method invloves the use of scc. device employed between the location where the command signal is received and the location where the reference input is delivered to the control system; and the control system will be of either the open or closed loop type. However, it is generally desirable to have the control system contain within it a feedback path. Other types of feedback have been discussed in relation to the signal component control method.

It should be understood that the theory which has been expounded as underlying the present invention is believed to be correct, but other theories may be developed to support or explain the phenomena which has been established through experimental tests as well as computations as described herein. It should also be understood that the invention may be embodied in other physical forms than those specifically described herein, all of which are intended to be within the scope of the present disclosure.

In addition to the proposed AIEE symbols used throughout this specification, the following symbols are also used, and to the extent that there is any inconsistency between the two groups of symbols, the symbols listed below prevail.

TIME $t$=instantaneous time.
$T$=a period of time in the same units as used for $t$.
$T_i$=a time delay in the same units as used for $t$.

VARIABLES $v(t)$=command signal, a function of time, $t$.
$q(t)$=indirectly controlled variable, a function of time, $t$.

PARAMETERS $A_0$=a real number.
$A_1, A_2 \ldots A_n$=real or complex numbers, and if complex appearing in conjugate pairs.
$B_0, B_1 \ldots B_n \ldots B_{n+l}$=constant real numbers.
$M_a, M_b, M_c, M_d$=real numbers.
$a_0, a_1 \ldots a_n$=constants.
$K_1 \ldots K_i, K_{i+l} \ldots K_n$=constant real numbers.
$\xi_1, \xi_2 \ldots \xi_n$=real or complex numbers, and if complex appearing in conjugate pairs.

GENERAL SUBSCRIPTS $0, 1, 2,..i, k \ldots n, n+l \ldots n+l$=integers.

As used in the claims, the term "signal" may be in electrical, mechanical, hydraulic, thermal, or other form. In fact, any detectable quantity such as temperature, displacement, charge, etc., is herein defined as coming within the scope of the term "signal." In addition the phrase "signal passing through the control system" as used in the appended claims is intended to make it clear that the scc. operations may be applied at whatever point in the system it is convenient. For example, the scc. operations may be applied (1) at the point just before the command signal reaches the control system; (2) at the point where the signal is just leaving the system which existed before the present controls for altering the system were introduced; and (3) at any point within the control system where the signal passing through the control system is accessible.

The claims thus recognize that the signal, at the point at which it is operated on, may be changed in form or value from the original input signal or may actually be the original input signal.

We claim:

1. The method of controlling the output of a control system in response to a command signal to produce an output for the system that is substantially a specified function of the command signal, comprising delaying a signal passing through the system different intervals of time and retaining the undelayed signal passing through the system to produce a plurality of components, altering the magnitude and, if necessary, the sign of said components so that, when added together, the resultant output signal is substantially said specified function of said input, and adding together said altered components.

2. The method of controlling the output of a control system in response to a command signal to produce an output for the system that substantially corresponds to said command signal, comprising delaying a signal passing through the system different intervals of time and retaining the undelayed signal passing through the system to produce a plurality of components, altering the magnitude and, if necessary, the sign of said components so that all periodic and aperiodic parts of the output are reduced to zero after a very short period of time, leaving a remainder that corresponds to said command signal itself, and adding together said altered components to produce said output.

3. The method of controlling the output of a control system in response to a command signal to produce an output for the system that substantially matches a combination of derivatives or a linear function of the derivatives of the command signal, comprising delaying a signal passing through the system different intervals of time and returning the undelayed signal passing through the system to produce a plurality of components, altering the magnitude and, if necessary, the sign of said components so that, when added together, all parts are reduced to zero after a very short period of time with the exception of the parts corresponding to the desired combination of derivatives or linear function of the derivatives of said command signal, and adding together said altered components to produce said output.

4. The method of controlling the output of a control system in response to a command signal to produce an output for the system that substantially corresponds to a function that oscillates at one or more of the natural frequencies of said control system, comprising delaying a signal passing through the system different intervals of time and retaining the undelayed signal passing through the system to produce a plurality of components, altering the magnitude and, if necessary, the sign of said components so that, when added together, all parts are reduced to zero after a very short period of time with the exception of the parts which oscillate at one or more of the natural frequencies of said control system, and adding together said altered components to produce said output.

5. In a non-linear control system wherein a command signal applied to the control system produces an output from the control system having a non-linear relationship to the command signal, its derivatives, and its integrals, the method for conforming the output to a specified function of the command signal comprising delaying a signal passing through the system successively by discrete intervals of time $T_0, T_1 \ldots T_n$ respectively to produce a plurality of components, altering the value of each such component by the factors $B_0, B_1, \ldots B_n$ respectively, combining the delayed and altered components to produce a resultant signal, and varying certain ones of the $T_0, T_1, \ldots T_n$ and $B_0, B_1, \ldots B_n$ values such that at any instant of time the values $T_0, T_1, \ldots T_n$ and $B_0, B_1, \ldots B_n$ satisfy the relationship established by equating the expression for the output of the system as modified by the control method with the expression for a specified function of the command signal, wherein the delay time $T_0$ may be equal to zero.

6. In a system having a control device and controlled apparatus acting upon a command signal to produce a system output that is substantially a specified function of the command signal, the improvement wherein the control device comprises means for delaying a signal passing through the system different intervals of time, for retaining the undelayed signal passing through the system, and for altering the magnitude and, if necessary, the sign of each such delayed and undelayed signal to form a plurality of components at connection points spaced therealong, and means connected to said connection points for summing said components to produce a resultant signal in the system such that the system output is substantially said specified function of the command signal.

7. A device for controlling a system having a given command signal to produce a system output that is substantially a specified function of the command signal, said device comprising means for delaying a signal passing through the system by the discrete intervals $T_0, T_1, \ldots T_n$, respectively, wherein $T_0$ may equal zero, and for altering the value of each such delayed signal by the factors $B_0, B_1, \ldots B_n$, respectively, to form a plurality of components at connection points spaced therealong, and means connected to said connection points for summing said components to produce a resultant signal where the values $T_0, T_1, \ldots T_n$ and $B_0, B_1, \ldots B_n$ satisfy the relationship established by equating the expression for the output of the system as modified by the control device with the expression for a specified function of the command signal.

8. In a system wherein a command signal produces a control signal having a non-linear relationship to the command signal, a control device comprising means for delaying a signal passing through the system by the discrete intervals $T_0, T_1, \ldots T_n$, respectively, wherein $T_0$ may equal zero, and for altering the value of each such delayed signal by the factors $B_0, B_1, \ldots B_n$, respectively, to form a plurality of components at connection points spaced therealong, means connected to said connection points for summing said components to produce a resultant signal, and means responsive to non-linearities in said system and connected to said first means for altering the values of certain ones of the $T_0, T_1, \ldots T_n$ and $B_0, B_1, \ldots B_n$ such that at any instant the values $T_0, T_1, \ldots T_n$ and $B_0, B_1, \ldots B_n$ satisfy the relationship established by equating the expression for the output of the system as modified by the control device with the expression for a specified function of the command signal.

References Cited in the file of this patent
UNITED STATES PATENTS

| | | |
|---|---|---|
| 2,024,900 | Wiener | Dec. 17, 1935 |
| 2,263,376 | Blumlein et al. | Nov. 18, 1941 |
| 2,273,163 | Wilson | Feb. 17, 1942 |
| 2,273,829 | Boyle | Feb. 24, 1942 |
| 2,759,044 | Oliver | Aug. 14, 1956 |

UNITED STATES PATENT OFFICE
Certificate of Correction

Patent No. 2,801,351                            July 30, 1957

John F. Calvert et al.

It is hereby certified that error appears in the printed specification of the above numbered patent requiring correction and that the said Letters Patent should read as corrected below.

Column 7, line 24, strike out "to", second occurrence; column 8, line 47, for "objective" read —objectives—; column 9, line 9, for "pur-" read —purpose.—; line 31, for "$B_{n+1}$" read —$B_{n+1}$—; column 10, line 55, for "invloves" read —involves—; column 11, line 19, for "$K_{i+1}$" read —$K_{i+1}$—; line 24, for "$n+l$", first occurrence, read —$n+1$—.

Signed and sealed this 8th day of October 1957.

[SEAL]

Attest:
KARL H. AXLINE,
*Attesting Officer.*

ROBERT C. WATSON,
*Commissioner of Patents.*